April 5, 1932.  H. J. LOUNSBURY  1,852,533
RAILWAY DRAFT RIGGING
Filed Nov. 5, 1928  2 Sheets-Sheet 1
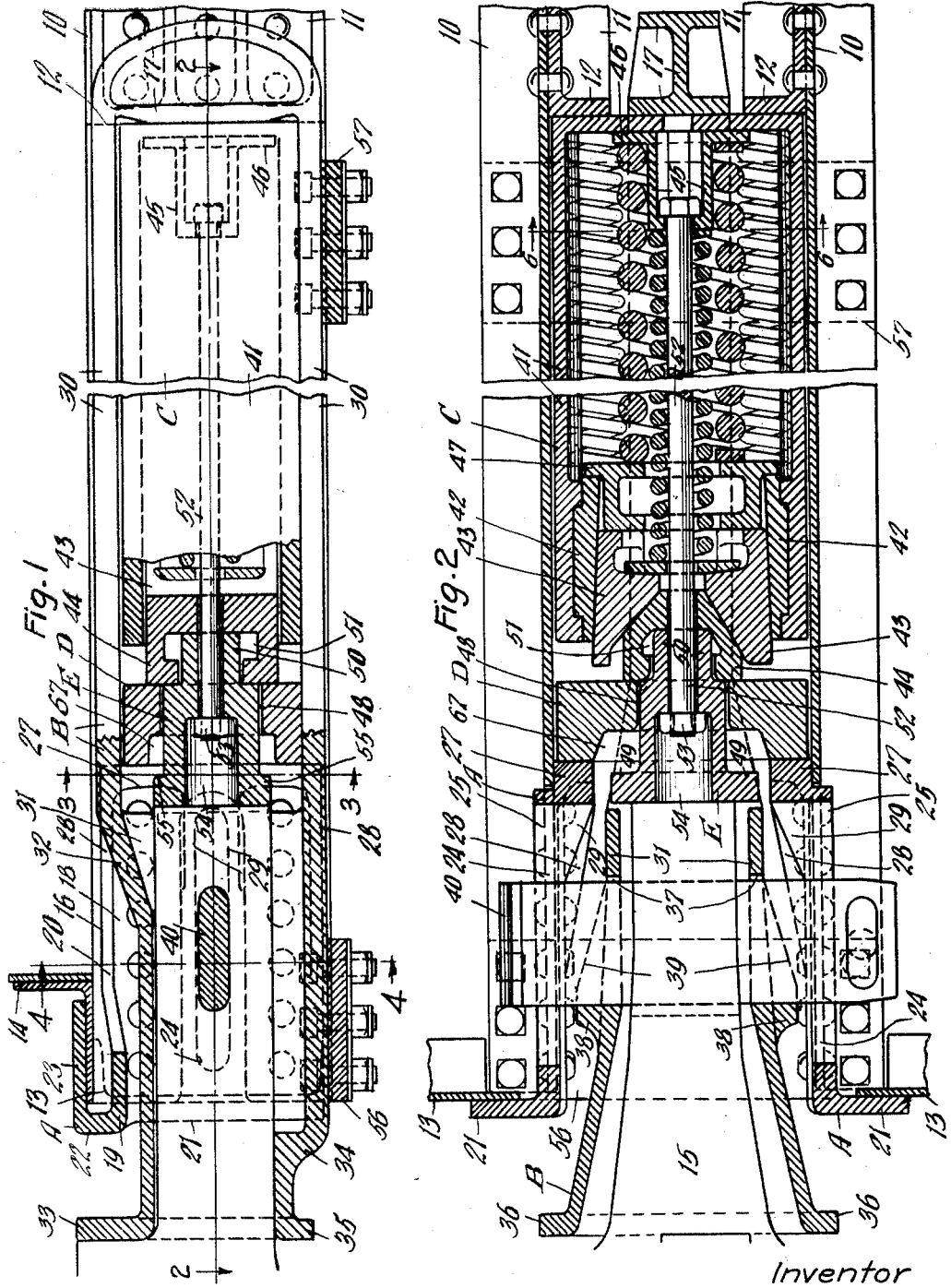
Witness
Hans M. Pachlitz
Inventor
Harvey J. Lounsbury
Joseph Harris
By  His Atty April 5, 1932.                    H. J. LOUNSBURY                    1,852,533
                                RAILWAY DRAFT RIGGING
                              Filed Nov. 5, 1928            2 Sheets-Sheet 2
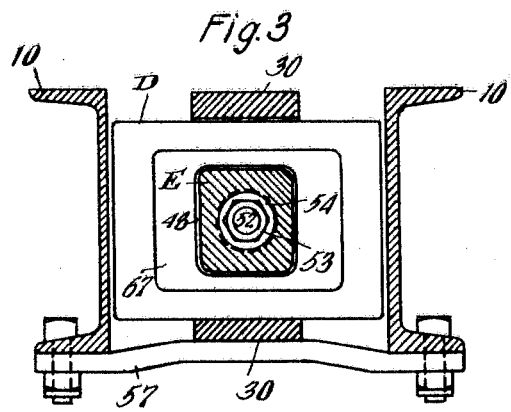
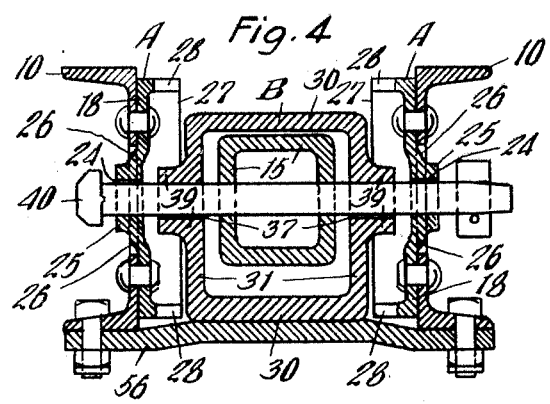
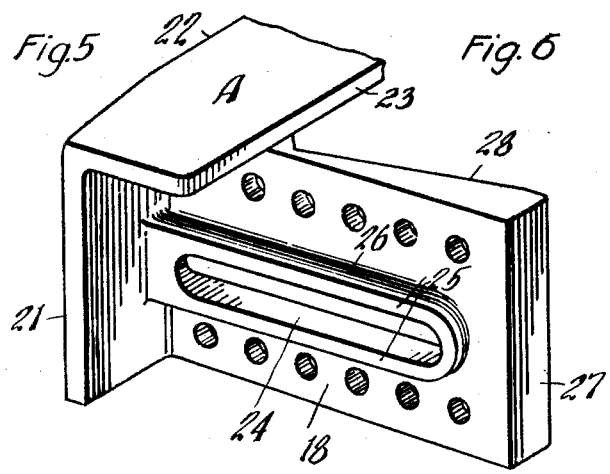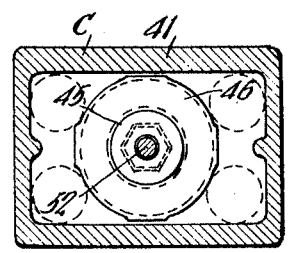
Witness
Hans M. Rachlitz
Inventor
Harvey J. Lounsbury
By Henry Fuchs
Atty.

Patented Apr. 5, 1932

1,852,533

UNITED STATES PATENT OFFICE

HARVEY J. LOUNSBURY, OF GLEN ELLYN, ILLINOIS, ASSIGNOR TO W. H. MINER, INC., OF CHICAGO, ILLINOIS, A CORPORATION OF DELAWARE

RAILWAY DRAFT RIGGING

Application filed November 5, 1928. Serial No. 317,148.

This invention relates to improvements in railway draft riggings.

One object of the invention is to provide a draft rigging for railway cars, including a coupler, connected yoke means and shock absorbing mechanism, and a front main follower disposed within the yoke means, wherein relatively longer travel of the coupler is provided for in buff than in draft, the longer travel in buff being produced by a pressure transmitting member interposed between the coupler butt and the shock absorbing mechanism, extending through the main follower and having relative movement thereto to effect the compression of the shock absorbing mechanism, the shock absorbing mechanism, main follower and pressure transmitting means being held assembled by retaining means which anchors the pressure transmitting means to the shock absorbing mechanism.

Another object of the invention is to provide a draft rigging including a coupler, a yoke connected thereto, and cooperating shock absorbing means within the yoke, and a casting secured to the draft sills through which the coupler shank and the yoke extend, the casting acting as a front stop member, wherein the yoke is so designed as to support the coupler shank in proper alinement with the shock absorbing means and the sides of the yoke at the point of connection with the coupler shank are reinforced to strengthen the same and especially the key receiving opening thereof, and the side walls of the stop casting which receive the coupler key are formed so as to accommodate the reinforced sections of the yoke upon lateral swinging movement of the same.

Still another object of the invention is to provide a friction shock absorbing mechanism for railway draft riggings, including a friction shell, liners detachably secured to the side wall of the shell, a friction system including friction shoes and wedge means cooperating with the shoes, the shoes having frictional engagement with the liners, a spring follower cooperating with the shoes and having shouldered engagement with the liners, an anchoring element, a spring resistance means interposed between the spring follower and the anchoring element and holding the anchoring element in yielding engagement with the rear wall of the shell, and a retainer bolt anchored to the anchoring element and wedge to hold the mechanism assembled, the bolt being connected to the wedge by a nut at the outer end of the bolt, whereby a yielding support is provided for the retainer bolt to permit slight yielding thereof in recoil during release of the mechanism to prevent shearing off of the nut from the bolt.

A more specific object of the invention is to provide a railway draft rigging including a coupler, yoke means connected thereto, friction shock absorbing mechanism within the yoke, including wedge actuated friction means and a front main follower cooperating with the wedge, wherein a pressure transmitting member extends through the main follower and is relatively movable thereto, the same being interposed between the inner end of the coupler shank and the wedge member to provide for greater compression of the friction shock absorbing mechanism in buff than in draft, and the friction shock absorbing mechanism, main follower and pressure transmitting member are held assembled by providing shouldered engagement between the main follower and pressure transmitting member and anchoring the pressure transmitting member to the shell of the friction shock absorbing mechanism.

In the drawings forming a part of this specification, Figure 1 is a longitudinal, vertical, sectional view through a portion of the underframe structure of the car, illustrating my improvements in connection therewith. Figure 2 is a horizontal, longitudinal, sectional view, corresponding substantially to the line 2—2 of Figure 1. Figures 3 and 4 are transverse, vertical, sectional views, corresponding respectively to the lines 3—3 and 4—4 of Figure 1. Figure 5 is a detailed perspective view of a portion of the combined striking casting and front stop member employed in connection with my improvements. And Figure 6 is a vertical, transverse, sectional view at the inner end of the friction casing of the shock absorbing mechanism, corresponding substantially to the line 6—6 of Figure 2.

In said drawings, 10—10 indicate channel-shaped center or draft sills of a railway car underframe structure. At the bolster of the car, a center filler casting 11 of usual form is employed, the same having forwardly extending stop lug members 12—12 formed integral therewith. The end sill structure of the car comprises members 13—13 and 14 which are suitably connected to the draft sills. The coupler of the car is designated by 15, the shank and a portion of the head thereof being shown.

In carrying out my invention, I provide a combined striking casting and front stop member A, a vertical yoke B enclosing a shock absorbing mechanism generally indicated by C and a cooperating front main follower D; a pressure transmitting member E extends through the main follower and is interposed between the inner end of the coupler shank and the shock absorbing mechanism.

The combined striking casting and front stop member A is in the form of a box-like member open at the bottom side and front and rear ends and having a horizontal top wall 16 and vertically disposed spaced side walls 18—18. The top wall is downwardly offset at the forward end, as indicated at 19, and is provided with a rearwardly extending elongated central opening 20 which accommodates the upper section of the yoke B. At the forward end, the side walls of the casting A are provided with relatively thick lateral flanges 21—21 which are formed integral with a transverse wall section 22 at the upper side of the casting forming a continuation of the top wall thereof. The side flanges 21, together with the wall section 22, form the striking plate member proper of the casting A. The transverse wall 22 is also provided with a rearwardly extending horizontal top wall section 23 which engages over the angle end sill member 14. The side walls 18 of the casting A are preferably secured to the webs of the side sills 10 by rivets, as most clearly shown in Figures 1, 2 and 4. The side walls 18 of the casting are provided with longitudinal openings 24—24 adapted to accommodate the usual coupler key. As most clearly illustrated in Figures 4 and 5, the key receiving openings 24 are reinforced by spaced, horizontally disposed, top and bottom wall sections 25—25 and end wall sections 26—26. The wall sections 25 are connected to the main body portion of the corresponding side wall 18 by outwardly offset portions 26—26 which provide walls which converge laterally outwardly of the casting. The outer wall sections 24 define the key guide slot proper and, as shown in Figures 4 and 5, are spaced apart the proper distance vertically to accommodate and guide the key. The offset wall sections 26 provide concave seats or recesses which accommodate certain reinforcements of the yoke, as hereinafter more clearly pointed out.

The inner ends of the walls 18 are thickened, as indicated at 27—27, to provide the front stop lugs proper of the railway draft rigging. The laterally enlarged sections 27 are suitably reinforced by horizontally disposed top and bottom ribs 28 formed integral with the inner faces of the side walls. Additional reinforcing ribs 29—29 are also provided at the top and bottom sides of the key receiving openings. As clearly shown in Figures 1 and 2, the webs of the center sills 10 are cut away so as to accommodate the offset wall sections 24 of the side walls 18 of the casting A and permit assembly of the casting between the draft sills by inserting the same longitudinally between the sills from the end of the car.

The yoke B comprises top and bottom arm members 30—30 and a vertical rear end section 17 formed integral with the top and bottom arms. At the front end of the yoke, the top and bottom arms are connected by vertical side walls 31—31, thereby forming a box-like end structure adapted to accommodate the coupler shank. As most clearly shown in Figure 1, the top arm 30 of the yoke is downwardly offset at the forward end, as indicated at 32, and has a vertical flange section 33 at the outer end thereof which is adapted to abut the inner end of the coupler head. The bottom arm 30 of the yoke has an upwardly offset section 34 at the extreme forward end thereof, which directly supports the bottom side of the coupler shank adjacent the head of the coupler. The section 34 is preferably provided with a downwardly extending flange portion 35 at the extreme forward end thereof, which is in substantial vertical alinement with the flange 33 of the top arm. At the inner ends, the side walls 31 are substantially parallel, as shown in Figure 2, while the front end sections thereof diverge outwardly to correspond with the formation of the front end portion of the coupler shank.

The extremities of the side walls 31 at the front end of the casting are provided with vertically disposed lateral flanges 36—36 which lie in the same plane as the flanges 33 and 35. The side wall members 31 are provided with alined coupler key receiving openings 37—37 which are reinforced at the forward ends by enlargements 38—38 and top and bottom rib members 39—39 which are cut away at their inner ends, as shown. As will be evident upon reference to Figure 4, the enlarged portions which reinforce the key receiving openings 37 of the yoke will be accommodated within the offset or recessed portions of the side walls of the stop casting A when the yoke is swung laterally to either side of its centered position to accommodate itself to the lateral swinging movement of the coupler when the cars are being operated on curved track. By this arrangement, the coupler key receiving openings of the yoke are properly reinforced without in any way interfering with the lateral swinging movement of the coupler and yoke member. The coupler shank is connected to the yoke B by the usual transverse key 40 which extends through alined openings in the coupler shank, the openings 37 of the yoke, and has the outer ends thereof working in the guide slots 24 of the casting A. The key 40 is of the usual headed type and has any well known form of retaining means at the free end thereof.

The shock absorbing mechanism C, as hereinbefore stated, is disposed within the yoke B. This mechanism is preferably of the friction type and, as shown, comprises a rectangular casing 41 having liners 42—42 detachably secured to the opposite side walls thereof, the liners being provided with enlargements which are seated in recesses provided in the side walls at the front end of the casing, as most clearly shown in Figure 2.

The liners thus present abutment shoulders at their inner ends which cooperate with the spring follower, as hereinafter pointed out, to limit outward movement of the latter. The liners are also provided with longitudinally disposed friction surfaces with which a pair of friction shoes 43 cooperate, the friction shoes being actuated by a wedge block 44. The friction system of the shock absorbing mechanism including the shoes 43 has its movement yieldingly opposed by a spring resistance comprising a central member and four outer members at the corners of the casing. The central member of the spring resistance comprises an inner coil and a heavier outer coil, the inner coil being interposed between a spring follower disc engaging enlargements on the shoes and a thimble 45 at the inner end of the casing. The heavier outer spring is interposed between a flange 46 on the thimble and a spring follower 47 which has shouldered engagement with the inner ends of the liners to limit outward movement thereof and maintain the thimble seated on the end wall of the casing. As shown in Figure 2, the spring follower 47 is provided with a central opening through which the inner coil of the spring resistance extends. The front follower D is also disposed within the yoke and normally engages the stops 27 of the casting A and limits outward movement of the wedge block 44. As most clearly shown in Figures 1, 2 and 3, the follower block D is centrally recessed on the outer side, as indicated at 67, and is provided with a rectangular central opening 48 adapted to accommodate the pressure transmitting member E for longitudinal sliding movement. The follower D is provided with a flat transverse inner end face on which the wedge 44 directly bears.

The pressure transmitting member E is in the form of a relatively heavy bar-like member having lateral side flanges 49—49 at the front end thereof. The member E has a flat front end face which bears directly on the inner end of the coupler shank.

The main body portion of the member E is of substantially rectangular cross section and is accommodated for longitudinal sliding movement within the opening 48 of the follower D. At the inner end, the pressure transmitting member E is reduced in cross section, as indicated at 50, and extends into an opening 51 provided within the wedge block 44, the inner end of the pressure transmitting member engaging the flat vertical end wall of said opening so as to transmit the force to the wedge member.

The pressure transmitting member E is anchored to the casing of the friction shock absorbing mechanism by a retainer bolt 52 which has the head thereof anchored within the thimble 45 and has the nut 53 thereof disposed within an opening 54 provided in the pressure transmitting member. It will be evident that the pressure transmitting element is thus held assembled with the remainder of the friction shock absorbing mechanism and that the flanges 49 of the pressure transmitting member provide shouldered engagement with the front main follower D to anchor the follower to the shock absorbing mechanism. It should also be noted that the pressure transmitting member E is provided with vertical shoulders 55 at the forward end thereof, which cooperate with the main follower D in holding the same anchored to the shock absorbing mechanism. Inasmuch as the outer coil of the main spring resistance member holds the thimble 45 yieldingly seated, danger of shearing off or breakage of the retainer bolt is avoided, because when the bolt is subjected to severe tension strains upon recoil during release of the mechanism the outer coil of the spring resistance will yield to the proper extent.

The pressure transmitting element E, together with the wedge block 44, forms wedge pressure transmitting means for transmitting the actuating force from the coupler shank to the friction shoes of the shock absorbing mechanism and the retainer bolt 52 serves to anchor this wedge pressure transmitting means to the friction casing or shell.

The yoke B is supported from the draft sills by front and rear saddle plates 56 and 57 secured to the bottom flanges of the draft sills. As clearly illustrated in Figure 1, the yoke is thus supported for horizontal longitudinal movement and the coupler shank is guided between the top and bottom walls of the front end portion of the yoke, and the flanges at the front end of the yoke are in engagement with the coupler head.

In assembling the parts of my improved railway draft rigging, the spring resistance and thimble with the retainer bolt anchored thereto are first inserted within the casing of the friction shock absorbing mechanism. The liners are next placed in position, thereby anchoring the spring follower 47 within the casing. The two friction shoes, spring follower disc and wedge block are then assembled with the casing. Next, the main follower D with the thimble E assembled therewith are placed in position and secured by the retainer bolt 52. The entire shock absorbing mechanism, including the front follower and pressure transmitting member which are anchored by the retainer bolt, forms a complete unit which is then assembled within the yoke B. The yoke and assembled parts are then placed between the draft sills and the coupler connected thereto by means of the coupler key 40.

In the operation of my improved railway draft rigging, assuming that the coupler is being pulled forwardly or outwardly in draft, the yoke B will be carried forwardly therewith through the medium of the connecting key 40, thereby pulling the casing of the friction shock absorbing mechanism C forwardly while the wedge block 44 is held stationary by engagement with the main follower D which is held against outward movement by the stop members 27 of the casting A. Movement of the parts is limited by engagement of the front end of the casing of the shock absorbing mechanism with the main follower D.

Upon a buffing action being applied to the coupler, the same will be carried inwardly, thereby forcing the pressure transmitting member E inwardly also and carrying the wedge block 44 therewith, the casing of the friction shock absorbing mechanism being held stationary at this time by the rear stop members 12. Inasmuch as the pressure transmitting member E is longitudinally movable with respect to the follower D, there will be a relative movement of the pressure transmitting element with respect to the follower D, equal to the clearance between the flanges 49 on the pressure transmitting member and the abutment face at the front side of the follower. In addition, there will be a movement of the pressure transmitting member equal to the clearance between the main follower and the front end of the casing of the friction shock absorbing mechanism. In other words, during the buffing action of the mechanism, the maximum movement of the friction wedge system with respect to the casing is equal to the clearance between the main follower and the front end of the friction casing, plus the clearance between the flanges of the pressure transmitting element and the main follower.

It will be evident that the movement of the parts during a buffing stroke will be greater than the movement of the parts during draft by an extent equal to the clearance between the flanges on the pressure transmitting element and the main follower D.

From the preceding description, taken in connection with the drawings, it will be evident that I have provided a unitary construction including the friction shock absorbing means, front main follower and pressure transmitting element which may be transported and handled without danger of the parts thereof becoming separated and may be applied as a whole to the yoke of the railway draft rigging. My improvements also provide a yoke construction having the key receiving openings thereof amply reinforced, without restricting the lateral swinging movement of the yoke, by providing recessed portions in the side members of the stop casting without in any way weakening the structure of the side walls at the key receiving openings thereof.

While I have herein shown and described what I consider the preferred manner of carrying out my invention, the same is merely illustrative and I contemplate all changes and modifications which come within the scope of the claims appended hereto.

I claim:

1. In a draft rigging for railway cars, the combination with a coupler and yoke connected thereto; of a friction shock absorbing mechanism and a front main follower within the yoke, said friction shock absorbing mechanism including a wedge block; means for limiting outward movement of the main follower; a pressure transmitting member movable with respect to the main follower and interposed between the coupler butt and wedge block; and means for anchoring the pressure transmitting member to the friction shock absorbing mechanism, the pressure transmitting member and main front follower having shouldered engagement to anchor the latter to the friction shock absorbing mechanism.

2. In a draft rigging for railway cars provided with spaced draft sills, the combination with a coupler; of a yoke connected to the coupler; a friction shock absorbing mechanism within the yoke, including a friction shell, spring resisted friction elements cooperating with the shell and a wedge member for forcing the friction elements against the friction shell surfaces; a front main follower within the yoke; means on the sills for limiting outward movement of the front main follower; a pressure transmitting member extending through the main follower and having longitudinal movement with respect thereto, said pressure transmitting member being interposed between the coupler butt and the wedge block, said pressure transmitting member and main follower having cooperating shoulders thereon to hold the main follower assembled with the other parts of the friction shock absorbing mechanism; and a retainer bolt for anchoring the pressure transmitting member to the friction shell of the friction shock absorbing mechanism.

3. In a shock absorbing mechanism, the combination with a casing provided with interior friction surfaces; of friction means cooperating with the casing friction surfaces, said friction means including wedge pressure transmitting means; a spring follower cooperating with the friction means and having shouldered engagement with the casing to limit its outward movement; a retainer bolt anchored at one end to the wedge pressure transmitting means and at the other end to a retaining element; spring means opposing movement of the friction means inwardly of the casing, said spring means being interposed between the spring follower and retaining element and holding the latter yieldingly seated on the end wall of the casing.

4. In a shock absorbing mechanism, the combination with a casing having interior friction surfaces at one end thereof and closed by a wall at the other end; of friction shoes cooperating with the friction surfaces; wedge pressure transmitting means having wedging engagement with the shoes; a retaining element bearing on the end wall of the casing; a spring follower having shouldered engagement with the casing to limit outward movement of the former with respect to the casing; spring means opposing inward movement of the shoes, said spring means including a spring unit under initial compression interposed between the spring follower and retaining element; and an anchoring member for the wedge pressure transmitting means having its opposite ends connected to the wedge pressure transmitting means and retaining element, respectively.

5. In a shock absorbing mechanism, the combination with a shell closed at one end; of liners detachably secured to the walls at the other end of the shell, said liners presenting interior stop shoulders; friction means cooperating with the liners, said friction means including a pressure transmitting spreading means; a spring follower cooperating with the friction means and having its outward movement limited by engagement with the stop shoulders presented by the liners; retaining means anchored at one end to the pressure transmitting spreading means; and spring resistance means opposing movement of the friction means inwardly of the shell, said spring resistance means including a member bearing at one end on the spring follower and at the other end engaging the retaining means to oppose outward movement thereof.

6. In a shock absorbing mechanism, the combination with a casing open at one end and having a transverse wall at the other end; of interior liners detachably secured to the opposed walls of the casing; friction shoes having frictional engagement with the liners; wedge pressure transmitting means having wedging engagement with the shoes; a spring follower having shouldered engagement with the liners to limit outward movement of the former; a cap having a flange section seated on the transverse end wall of the casing; a retaining bolt having one end anchored to the cap and the other end anchored to the wedge pressure transmitting means; and spring resistance means opposing inward movement of the friction shoes, said spring resistance including inner and outer members, said inner member bearing on the cap proper and the outer member being interposed between the spring follower and the flange of the cap.

In witness that I claim the foregoing I have hereunto subscribed my name this 2nd day of November, 1928.

HARVEY J. LOUNSBURY.